United States Patent [19]

Nemets et al.

[11] 4,173,878
[45] Nov. 13, 1979

[54] METHOD OF MANUFACTURING TANGENTIAL EXPANDERS FOR OIL CONTROL PISTON RINGS

[76] Inventors: Rusaam S. Nemets, Sirenevy bulvar, 57, kv. 50; Efim S. Gorbulev, Tovarischesky pereulok, 9/11, kv. 5; Veniamin A. Parygin, ulitsa Malysheva, 18, kv. 200, all of Moscow; Jury M. Kontsov, ulitsa Krasnova, 1, kv. 58, Odessa; Viktor P. Moldavanov, Pionerskaya ulitsa, 10, kv. 6, Odessa; Mark A. Shaforenko, Sredne-Fontanny pereulok, 16/18, kv. 75, Odessa; Alexei K. Ignatiev, Volgogradsky prospekt, 71, kv. 167; Gennady S. Zaikovsky, Matveevskaya ulitsa, 4, korpus 1, kv. 148, both of Moscow; Mikhail I. Volnyakov, ulitsa Malinovskogo, 31, kv. 95, Odessa, all of U.S.S.R.

[21] Appl. No.: 870,176

[22] Filed: Jan. 17, 1978

[51] Int. Cl.² ............................................. B23P 15/06

[52] U.S. Cl. ........................................ 72/137; 72/177; 29/156.6

[58] Field of Search ............... 29/156.6; 277/139, 140, 277/160, 196; 140/89; 72/137, 177, 181

[56] References Cited

U.S. PATENT DOCUMENTS

| | | | |
|---|---|---|---|
| 1,343,753 | 6/1920 | Sloper | 72/177 |
| 2,293,450 | 8/1942 | Wilkening | 277/196 |
| 2,378,058 | 6/1945 | Blumensaadt | 140/89 |
| 2,713,527 | 7/1955 | Pien | 277/140 |
| 2,742,277 | 4/1956 | Small | 29/156.6 |
| 2,817,564 | 12/1957 | Marien | 277/140 |
| 3,284,880 | 11/1966 | Meyer | 29/156.6 |

*Primary Examiner*—Lowell A. Larson
*Attorney, Agent, or Firm*—Lackenbach, Lilling & Siegel

[57] ABSTRACT

According to the claimed method a round wire is first flattened and then formed into a serpentine flat spring. The segment portions of this spring are bent up in the form of thrust shoulders and calibrated for height. The shaped spring is coiled into a spiral on a mandrel, compressed and heat-treated before cutting it into individual tangential expanders.

2 Claims, 14 Drawing Figures

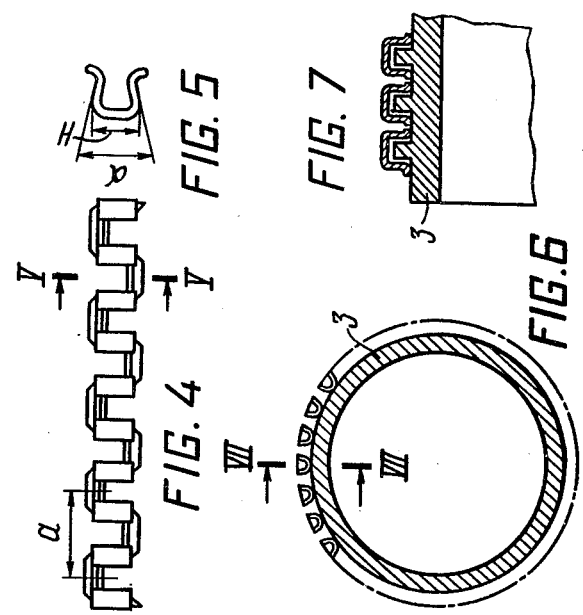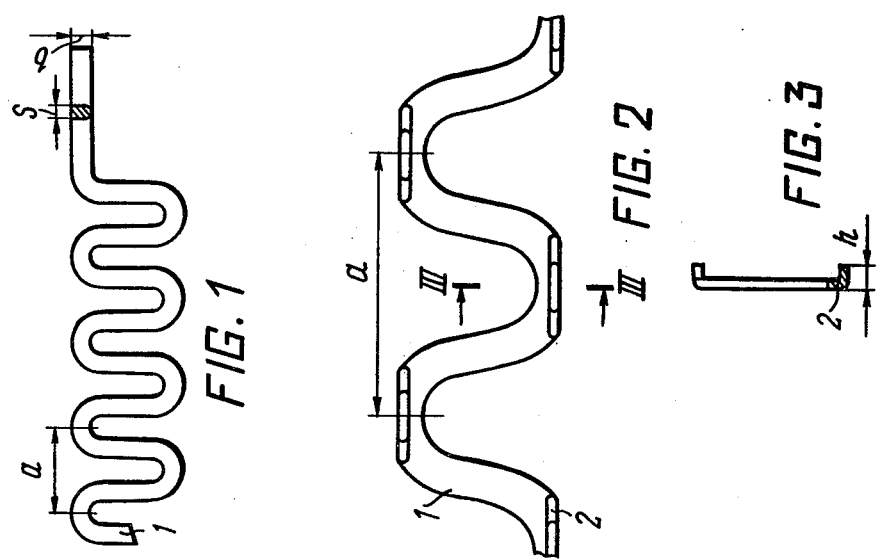

METHOD OF MANUFACTURING TANGENTIAL EXPANDERS FOR OIL CONTROL PISTON RINGS

BACKGROUND OF THE INVENTION

1. Field of the Invention

The present invention relates to a method of manufacturing all-bent spring elements and, more particularly, tangential expanders for oil control plate-type piston rings by the method of plastic deformation.

2. Description of the Prior Art

Known in the prior art is a method of manufacturing tangential expanders of all-bent construction for plate-type oil control piston rings (French Pat. No. 1,529,788, Cl.B210) including the following operations:

coiling a serpentine blank from round wire;

flattening the round wire serpentine blank into a rectangular wire serpentine blank;

extruding thrust shoulders and stiffener ribs in the rectangular wire serpentine blank;

calibrating for width the serpentine blank with extruded thrust shoulders and stiffener ribs; and bending the calibrated serpentine blank into an U-shaped profile.

The disadvantages of the known method of manufacturing all-bent tangential expanders are that, in the first place the flattening of the serpentine blank made from round wire is a labor-consuming operation, because it requires preliminary annealing of the blank in order to relieve internal stresses after bending the round wire into a serpentine blank; and for intermediate annealing operations following each intermediate flattening pass there must be not less than two. Otherwise the blank may become cracked since the extent of deformation is sufficiently large. The wire is anisotropic from the viewpoint of its mechanical properties; therefore, the flattening deformation must be strictly directional and combined with fixing the pitch which is highly problematic in practice. Otherwise the blank may have local overflows and distortions due to non-uniformity of hardening.

The entire process of flattening including intermediate annealing should take place with the compressed serpentine blank which is extremely difficult. Besides, extrusion of the thrust shoulders followed by calibration of the serpentine blank for width is a very labor-consuming operation for the same reasons as flattening. In addition, it should be borne in mind that the height of the thrust shoulders should be made with a high degree of accuracy (to about 0.05 mm).

OBJECTS OF THE INVENTION

An object of the present invention is to provide a method of manufacturing tangential expanders for oil control piston rings by plastic deformation which would increase considerably the accuracy of the produced all-bent tangential expanders.

An object of the present invention is to provide a method of manufacturing tangential expanders which would be characterized by a comparatively low labor requirement and would produce high-quality articles without a considerable increase in the production cost.

Another object of the present invention is to provide an improved method of manufacturing tangential expanders which would not require the use of radically new technological equipment and costly reorganization of the production process.

SUMMARY OF THE INVENTION

To accomplish the above-specified technical problem and achieve these and other objects according to the present invention, proposed hereinbelow is a method of manufacturing tangential expanders for oil control piston rings consisting of producing an initial serpentine flat spring from a flattened wire; forming thrust shoulders, calibrating them, bending a U-shaped profile in the cross-section of the initial spring; coiling this spring into a spiral on a mandrel and cutting said spiral into measured lengths, each constituting a tangential expander in the form of an all-bent spring ring. This method is characterized in that the round wire is flattened before bending it into a serpentine spring. The thrust shoulders are shaped from the segment portions of the serpentine spring, which is followed by calibration of said thrust shoulders in height. After coiling said spring into a spiral on a mandrel, said spring is thermally stabilized across the diameter and heat-hardened in the compressed state.

This sequence of steps ensures a higher accuracy both in forming the serpentine spring from a metal strip and in the subsequent operations of bending and calibrating the thrust shoulders. This process produces the serpentine spring without such undue changes in the structure of the metal strip as would affect adversely the strength and resilient characteristics of the finished product.

In an embodiment of the present invention disclosure is made of a method of manufacturing tangential expanders characterized in that the above-mentioned operations of forming and calibrating the thrust shoulders are effected with the serpentine spring fixed along the pitch of its waves.

Such fixing of the manufactured serpentine spring permits the required dimensional accuracy of the tangential expander to be obtained without increasing the amount of labor required in the process of production.

BRIEF DESCRIPTION OF THE DRAWINGS

Now the invention will be described in detail by way of its practical realization with reference to the accompanying drawings, in which:

FIG. 1 illustrates a serpentine flat spring;

FIG. 2 shows the spring of FIG. 1 with bent thrust shoulders;

FIG. 3 is a sectional view taken along line III—III of FIG. 2;

FIG. 4 shows a spring blank formed with an U-shaped profile;

FIG. 5 is a sectional view taken along line V—V of FIG. 4;

FIG. 6 shows a spring blank on a mandrel;

FIG. 7 is a sectional view taken along line VII—VII of FIG. 6;

DETAILED DESCRIPTION OF THE INVENTION

Figure 8:
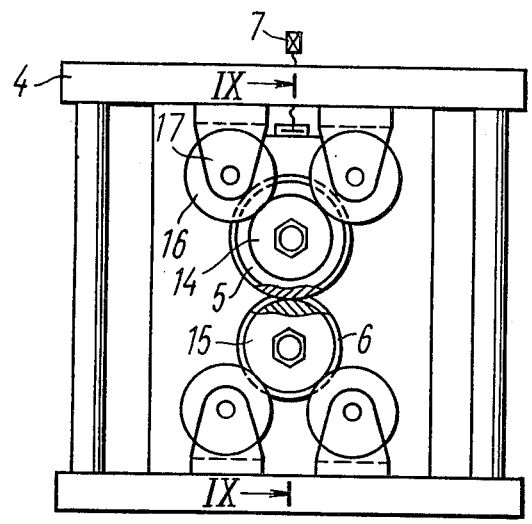
FIG. 8 is a front view of the profiling head.

The initial blank is made from a flattened rectangular strip. Then, the thrust shoulders are bent and calibrated for height. The next steps include bending the U-shaped profile, coiling the U-shaped strip into a spiral on a mandrel on which the spiral is hardened and thermally stabilized. The spiral is then taken off the mandrel and cut into separate tangential expanders. After this the ring ends are cut in the joint of each expander. All the profiling operations are performed with the expander pitch being fixed with the aid of the pins and teeth of the profiling tool.

EXAMPLE

The all-bent tangential expanders are manufactured in the following sequence of steps:

1. A serpentine spring 1 (blank) made from a flattened steel rectangular strip (bxs) is coiled with its pitch "a" fixed (FIG. 1).
2. The thrust shoulders 2 are bent with the blank pitch "a" being fixed in the process (FIG. 3).
3. The thrust shoulders are calibrated for height to dimension "h," the blank pitch "a" being fixed in the process. (FIGS. 2 and 3).
4. The U-shaped profile is bent as required, the blank pitch "a" being fixed in the process (FIGS. 4 and 5).
5. The U-shaped profile is calibrated for dimension "H" and angle "α," the blank pitch being fixed in the process (FIG. 5).
6. The serpentine strip of the U-shaped profile is coiled into a spiral on a mandrel 3 (FIGS. 6 and 7);
7. The profiled spiral is hardened on the mandrel 3.
8. The profiled spiral is tempered on the mandrel 3.
9. The profiled spiral is taken off the mandrel 3 and cut into individual expanders.
10. The ends of the expander joint are undercut on a radius.

The method of manufacturing tangential expanders according to the invention differs from the prior art in that the serpentine blank, i.e., spring 1 (FIG. 1) is coiled from a flattened rectangular strip (bxs) instead of from round wire. The thrust shoulders are made by bending and calibrating them for height to dimension "h" instead of by extrusion followed by calibration of the serpentine blank for width.

The method of manufacturing tangential expanders according to the present invention requires no labor consuming operations, such as several intermediate annealing steps and extrusion which have to be performed with the serpentine blank held in a compressed state. It should also be pointed out that the accuracy of the height "h" of the thrust shoulders 2 made by bending and calibration is considerably higher than that after extrusion.

In the method according to the present invention the serpentine blank is fixed only along its pitch "a" in the course of profiling the tangential expander. This fixing can be carried out with the aid of pins and teeth of the profiling tool.

Given hereinbelow in a somewhat greater detail are some individual operations of the method and the equipment for their performance.

The thrust shoulders 2 of the serpentine blank are bent by profiling them in rollers, the pitch "a" being fixed with pins arranged radially in a staggered order around the circumference of one of the rollers, the other roller having holes to receive the pin heads.

The thrust shoulders are bent in four passes (four pairs of rollers). Calibration of the thrust shoulders for height "h" is effected by rolling them in rollers in four steps (two preliminary and two final calibrations), the pitch "a" being fixed by pins arranged radially in a staggered order on one of the rollers.

Bending and calibration for height "h" of the thrust shoulders is effected on profiling heads. Let us consider the design and functioning of a profiling head by describing calibration of the thrust shoulders for height "h."

Figure 9:
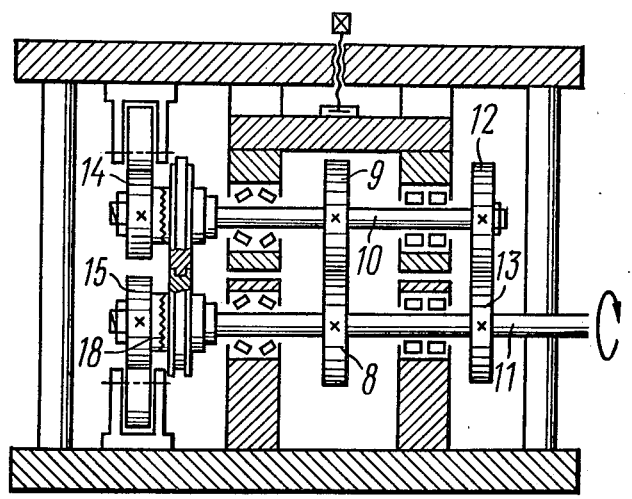
FIG. 9 is a cross-sectional view taken along line IX—IX of FIG. 8.

FIG. 8 shows a front view of the profiling head. FIG. 9 shows the serpentine spring after calibrating the thrust shoulders for height "h."

The profiling head comprises a body 4 (FIG. 8), an upper roller 5 provided with pins (not shown) arranged around the circumference in a staggered order, and a lower roller 6 provided with holes to receive the pins. During the setting-up operation the upper roller 5 can be moved up and down by an adjusting screw 7 which facilitates the replacement of the rollers 5 and 6; the lower roller 6 is rotated by an electric drive (not shown in the figure) and the torque is transmitted to the upper roller 5 via the gears 8 and 9 (FIG. 9). On the rear ends of the upper shaft 10 and lower shaft 11 supporting discs 12 and 13 are mounted while the rollers 5 and 6 are locked with each other, i.e., they are in contact with each other along the generating line of the unworking surface of the cylinder. When the upper shaft 10 is lowered all the way down, it sets the required working clearance between the rollers 5 and 6 in the forming zone. To stiffen the head and, consequently, to increase the accuracy of calibration of the thrust shoulders for height "h," the front ends of the shafts 10 and 11 are provided with supporting discs 14 and 15 which interact with the supporting discs 16 (FIG. 8) installed in brackets 17 on the head body 4. The supporting discs 14 and 15 are key-mounted (not shown) on the shafts 10 and 11. Torque is transmitted from the shafts 10 and 11 to the supporting discs 14 and 15 and then to the rollers 5 and 6 by triangular face splines 18 (FIG. 9).

The profiling head operates as follows. The blank with the already bent thrust shoulders 2 is fixed along pitch "a" by the pins located on the upper roller 5 and is inserted into the gap between the rollers 5 and 6 which rotate towards each other thus subjecting the thrust shoulders to plastic deformation so that after rolling their height "h" becomes stable.

The U-shaped profile is bent on a bending tool in one pass with the blank pitch "a" being fixed by the pins equispaced around the circumference of the punch.

Figure 10:
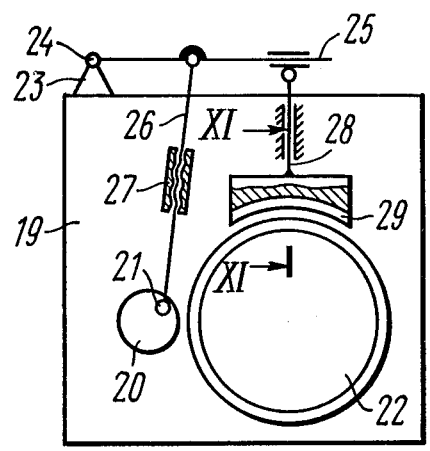
FIG. 10 shows the tool for bending the U-shaped profile.
Figure 11:
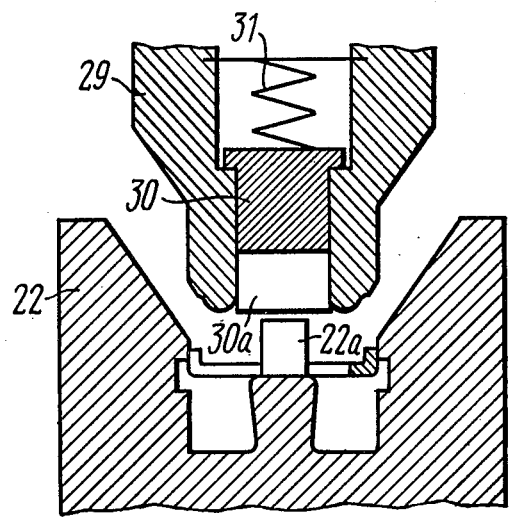
FIG. 11 is a cross-sectional view taken along line XI—XI of FIG. 10.

The bending tool is shown in FIG. 10 (front view) and in FIG. 11 before bending the blank.

The bending tool comprises a housing 19 which accommodates a shaft supporting bevel gears one end of a second shaft supports a washer and a pin of a Maltese cross (not shown) while the other end is provided with a washer 20 and a crank pin 21. A third shaft supports the disc of a Maltese cross (not shown) on one end and a bending tool punch 22 on the other. Arranged around the circumference of the punch 22 are pins 22a (FIG. 10) for fixing the blank pitch "a." Secured on the housing 19 (FIG. 10) is a bracket 23 with an axle 24 and a single-arm lever 25 rotating around said axle 24. This lever 25 is moved by the second shaft via a pitman 26 whose length is adjusted by a nut 27. The free end of the lever 25 is connected by a rod 28 with the reciprocating die 29 of the bending tool. Located inside the die 29 is a hold-down 30 (FIG. 11) with slots 30a receiving the pins 22a of the punch 22. The hold-down 30 is pressed by a spring 31 against the die 29.

The bending tool functions as follows. The shaft is rotated by means of an electric drive (not shown) and transmits it via bevel gears to the second or intermediate shaft which turns the shaft periodically, with stops via the Maltese cross. The same intermediate shaft reciprocates the die 29 via the crank (parts 20 and 21) pitman 26, single-arm lever 25 and rod 28. During each turn of the punch 22 the blank is delivered into the bending zone and, on the downward stroke of the die 29, it is first pressed against the punch 22 by the hold-down 30 loaded by the spring 31 and then, during the further downward movement of the die 29, the blank is bent.

Then the die 29 returns to the upper position, the punch 22 rotates through a certain angle, the next portion of the blank is delivered into the bending zone (under the die 29) and the bending cycle is repeated.

The U-shaped profile is calibrated on a calibrating tool in one pass, the pitch "a" of the blank being fixed by the pins equispaced around the circumference of the punch 22.

Figure 12:
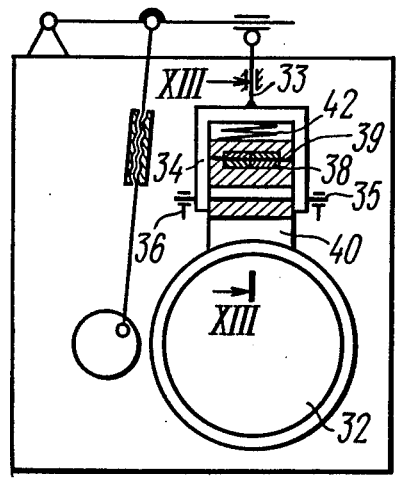
FIG. 12 shows the tool for calibrating the U-shaped profile.
Figure 13:
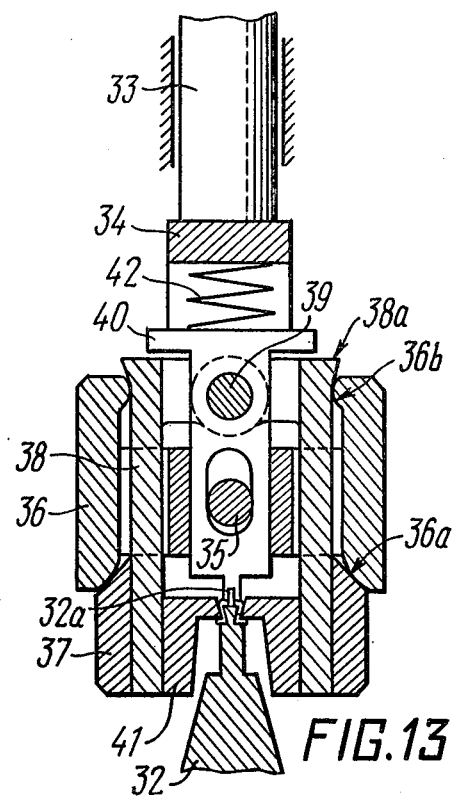
FIG. 13 is a cross-sectional view taken along line XIII—XIII of FIG. 12.

The calibrating tool is shown in FIG. 12 (front view) and in FIG. 13 (sectional view along line XIII—XIII in FIG. 12).

With respect to the method of transmitting the movement from the electric drive, the calibrating tool is similar to the tool for bending the U-shaped profile, but the calibrating die set differs from the bending die set in that it comprises a punch 32 (FIG. 12 and 13) with pins 32a arranged around its circumference, and a rod 33 rigidly connected with a holder 34 which accommodates an axle 35. The axle 35 is mounted with a frame 36. The chamfers 36a of the frame 36 interact with the cams 37 which are secured to levers 38 whose rockshaft 39 is secured in a hold-down 40. Fastened rigidly to the levers 38 are jaws 41 which ensure calibration of the blank on the punch 32 for dimensions "H" (FIG. 5) and angle "α."

The frame 36 (FIGS. 12 and 13) can move relative to the hold-down 40, while compressing a flexible element 42 in the form of a spring or a rubber buffer.

The calibrating tool functions as follows. As the punch 32 rotates through a certain angle, the blank is delivered into the calibrating zone. The rod 33 goes down together with the frame 36, the hold-down 40 and the associated parts 37, 38 and 41. The hold-down 40 presses the blank against the punch 32 and stops together with the associated parts 37, 38 and 41, whereas the rod 33 with the frame 36 continue moving downward and compress the flexible element 42. The chamfers 36a of the frame 36 press the cams 37, the levers 38 turn about the axle 39 and the jaws 41 press the blank from both sides against the punch 32, thereby calibrating the dimensions "H" and "α" of the U-shaped profile.

On the upward stroke of the frame 36 the projections 36b act on the cams 38a of the levers 38 and the latter together with the jaws 41 move away from the punch 32. Then the entire movable portion of the tool moves upward and the punch 32 rotates through a certain angle around its axle, taking the next portion of the blank and the calibrating cycle is repeated.

Described below is a sectional oil control ring made from a steel strip with an all-bent tangential expander manufactured by the method according to the present invention.

Figure 14:
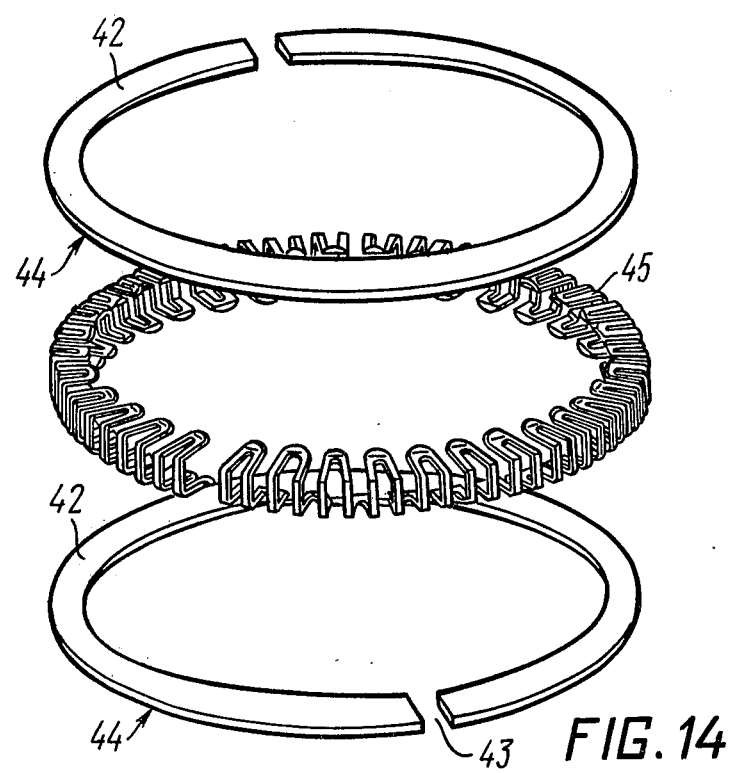
FIG. 14 shows an oil control ring with a tangential expander.

The sectional oil-control ring comprises two plate-type chrome-plated rings 42 (FIG. 14) intended for uniform distribution of an optimum layer of oil over the cylinder face and for removal of surplus oil into the engine sump.

The plate-type rings 42 are made in the form of flat circular plates whose diameters are close to the diameter of the cylinder bore. They are made from high-carbon spring-steel which is flattened, hardened and bent edge-wise into regular circles with clearances 43 for expansion at the ends, which makes up for growing dimensions during operation at temperatures up to 150° C. The working surface 44 of the rings is coated with chromium or molybdenum to insure resistance to wear.

The rings are resilient and their initial shape is not changed after installing them on the piston, when they expand by 8-10% on diameter.

The all-bent tangential expander 45 is intended to ensure reliable fitting of the chrome-plated plate rings against the cylinder face and the sides of the ring groove on the piston during the reciprocating motion of the piston, and to remove the surplus oil through the holes in the piston into the engine sump.

The tangential expander 45 is a circular compression spring having a U-shaped cross section and a lock at the ends.

We claim:

1. A method of manufacturing tangential expanders for oil control piston rings comprising the following operations: flattening round wire into a rectangular strip with rounded edges; bending the initial serpentine flat spring from said strip; forming thrust shoulders from segment portions of the serpentine spring; calibrating the thrust shoulders for height with simultaneous fixing of the serpentine spring along the pitch of its waves; bending a U-shaped profile in the cross section of the initial spring; coiling said spring into a spiral on a mandrel; heat-hardening the spiral fixed in a compressed state on the mandrel; and cutting said spiral into measured lengths, each constituting a tangential expander in the shape of an all-bent spring ring.

2. A method of manufacturing tangential expanders according to claim 1 wherein said operations of forming and calibrating the thrust shoulders are performed with simultaneous fixing of the serpentine spring along the pitch of its waves.

* * * * *